United States Patent
Dezonno

(10) Patent No.: US 7,095,843 B1
(45) Date of Patent: Aug. 22, 2006

(54) SELECTIVE MESSAGING IN A MULTIPLE MESSAGING LINK ENVIRONMENT

(75) Inventor: Anthony J. Dezonno, Bloomingdale, IL (US)

(73) Assignee: Rockwell Electronic Commerce Technologies, LLC, Wood Dale, IL (US)

( * ) Notice: Subject to any disclaimer, the term of this patent is extended or adjusted under 35 U.S.C. 154(b) by 0 days.

(21) Appl. No.: 09/246,389

(22) Filed: Feb. 9, 1999

(51) Int. Cl.
*H04M 5/06* (2006.01)

(52) U.S. Cl. .............................. 379/266.04; 379/88.08; 370/352

(58) Field of Classification Search ........... 379/266.01, 379/265.03, 266.08, 112.05, 266.04, 265.12, 379/88.08, 88.09, 265.02, 265.05, 266.03; 370/270, 328; 455/466; 707/100; 709/203
See application file for complete search history.

(56) References Cited

U.S. PATENT DOCUMENTS

| | | | | |
|---|---|---|---|---|
| 4,737,983 A * | 4/1988 | Frauenthal et al. .... | 379/266.08 |
| 5,073,890 A * | 12/1991 | Danielsen ............ | 370/270 |
| 5,140,611 A | 8/1992 | Jones et al. ............ | 375/7 |
| 5,168,515 A | 12/1992 | Gechter et al. ......... | 379/265 |
| 5,253,288 A | 10/1993 | Frey et al. ............ | 379/221 |
| 5,268,903 A | 12/1993 | Jones et al. ........... | 370/110.1 |
| 5,335,268 A * | 8/1994 | Kelly et al. ........... | 379/112.05 |
| 5,335,269 A | 8/1994 | Steinlicht ............. | 379/266 |
| 5,530,744 A * | 6/1996 | Charalambous et al. ................... | 379/266.08 |
| 5,751,795 A * | 5/1998 | Hassler et al. ......... | 379/93.17 |
| 5,825,869 A * | 10/1998 | Brooks et al. ......... | 379/265.12 |
| 5,910,983 A | 6/1999 | Dezonno et al. ......... | 379/266 |
| 6,263,065 B1 * | 7/2001 | Durinovic-Johri et al. ................... | 379/266.03 |
| 6,289,223 B1 * | 9/2001 | Mukherjee et al. ...... | 455/466 |
| 6,314,421 B1 * | 11/2001 | Sharnoff et al. ........ | 707/100 |
| 6,393,513 B1 * | 5/2002 | Estakhri et al. ........ | 711/103 |
| 6,522,743 B1 * | 2/2003 | Hurd .................. | 379/266.04 |
| 6,650,748 B1 * | 11/2003 | Edwards et al. ....... | 379/266.04 |

FOREIGN PATENT DOCUMENTS

EP 0 610 625 A2 8/1994

* cited by examiner

*Primary Examiner*—Gerald Gauthier
(74) *Attorney, Agent, or Firm*—Welsh & Katz, Ltd.

(57) ABSTRACT

A method and apparatus are provided for forwarding messages among peripherals of an automatic call distributor. The method includes the steps of forming a message table in a first peripheral of the automatic call distributor and forwarding a message from the first peripheral to a second peripheral of the automatic call distributor based upon a content of the message table.

25 Claims, 3 Drawing Sheets

| | MESSAGE SOURCE | MESSAGE TYPE | OBJECT |
|---|---|---|---|
| 38→ | ACD 14 | OVERFLOW | AGENT #1 |
| 40→ | HOST 24 | FAULT | ANI |
| 42→ | | | DNIS |
| 44→ | | | TRUNK# |
| 46→ | HOST 1 | | |
| 48→ | HOST 2 | | |
| 50→ | HOST 3 | | |
| | | | |

| MESSAGE ID | DESTINATION ID |
|---|---|
| #1 | a |
| #1 | b |
| #2 | c |
| #5 | d |
| . | . |
| . | . |
| . | . |
| #n | m |

|  | MESSAGE SOURCE | MESSAGE TYPE | OBJECT |
|---|---|---|---|
| 38→ | ACD 14 | OVERFLOW | AGENT #1 |
| 40→ | HOST 24 | FAULT | ANI |
| 42→ |  |  | DNIS |
| 44→ |  |  | TRUNK# |
| 46→ | HOST 1 |  |  |
| 48→ | HOST 2 |  |  |
| 50→ | HOST 3 |  |  |
|  |  |  |  |

SELECTIVE MESSAGING IN A MULTIPLE MESSAGING LINK ENVIRONMENT

FIELD OF THE INVENTION

The field of the invention relates to automatic call distributors and more particularly to peripheral devices attached to automatic call distributors.

BACKGROUND OF THE INVENTION

Automatic call distributors (ACDs) are known. Such devices are typically used by service organizations where ever a large number of calls must be matched with a limited number of agents. The calls handled by ACDs may be either incoming or outgoing.

Sales organizations may use automatic call distributors (ACDs) to receive and distribute incoming calls to customer service agents. Often the sales organization will disseminate a single telephone number to its customers. As customers call the telephone number, the calls must be distributed to the organization's agents. In order to distribute incoming calls, the ACD must first be able to detect an incoming call, then select an available agent and, finally to route the call to the selected agent.

In order to select an agent and equalize a workload among a group of agents, the ACD must be able to detect when an agent is idle (i.e., not occupied with a prior call). When ever an agent is idle, the switch may assign a call to that agent. Idle time, in fact, is often used as a equitable means of determining which agent will receive the next incoming call.

In the case of either incoming or outgoing calls, it is important for an agent working at an agent station to have ready access to customer records. In addition to a telephone, an agent station also typically includes a computer terminal coupled to a system database (host) for purposes of providing and maintaining customer records. While an agent could individually identify customers to the host by the manual entry of a customer identifier, it is generally more efficient that the ACD identify a customer to the host.

Typically, the ACD identifies the customer to the host by use of the customer telephone number. On either incoming or outgoing calls, the ACD transfers the telephone number to the host along with an identifier of a selected agent when the call is assigned to the agent. In the case of incoming calls, the ACD may identify a caller's telephone number through PSTN features such as automatic number identification (ANI).

In large service organizations, many ACDs and agent groups may exist over wide geographic areas, often in different time zones. ACDs may be interconnected to share call processing. ACDs which become overloaded may transfer (overflow) some calls to other ACDs.

Where a call is transferred from a first ACD to a second ACD, it is important to transfer whatever information exists about the call to a destination ACD. However, a transferring ACD may not know which ACD will ultimately accept the call. Often, the receiving ACD is served by a different host than the transferring ACD. As a consequence, a message transmitted from one ACD or host is typically transmitted (broadcast) to all connected ACDs and hosts. Further, any message received by a first ACD or host is automatically re-broadcast to any other ACD or host connected to the first ACD or host. As ACD systems have increased in size, the number of messages transmitted has also increased. In some cases unnecessary messages degrade system operation.

Accordingly, a need exists for a means of reducing message traffic within an ACD system.

SUMMARY

A method and apparatus are provided for forwarding messages among peripherals of an automatic call distributor. The method includes the steps of forming a message table in a first peripheral of the automatic call distributor and forwarding a message from the first peripheral to a second peripheral of the automatic call distributor based upon a content of the message table.

BRIEF DESCRIPTION OF THE DRAWINGS

FIG. 2 depicts a messaging table that may be used by the system of FIG. 1; and

FIG. 3 depicts a messaging matrix that may be used by the system of FIG. 1.

DETAILED DESCRIPTION OF A PREFERRED EMBODIMENT

Figure 1:
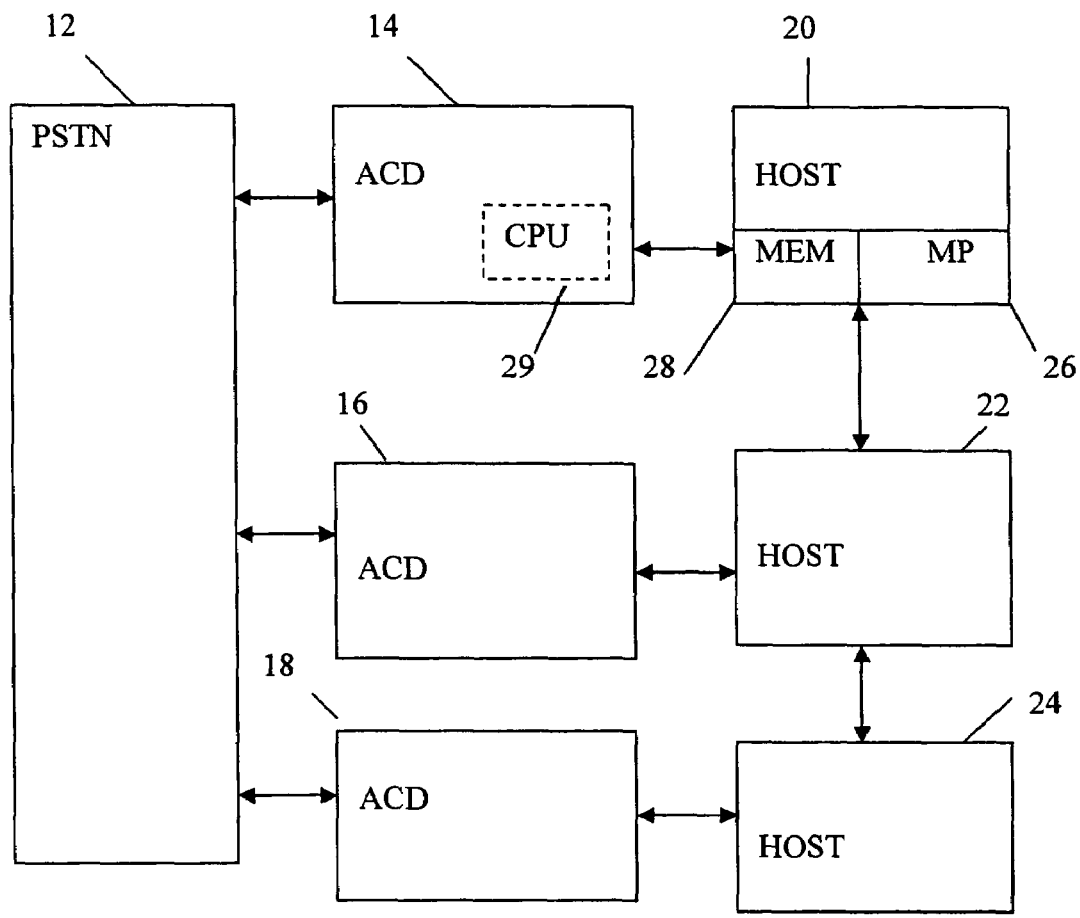
FIG. 1 depicts a block diagram of an automatic call distributor in accordance with an illustrated embodiment of the invention.

FIG. 1 is a simplified block diagram of an ACD system 10, generally, in accordance with an illustrated embodiment of the invention. The system 10 is provided with programmable messaging links for control of messages which are not of interest to a data device. The use of the programmable messaging link allows the data to remain backwards compatible with existing data applications.

The system 10 may be of a type similar to that provided by any of a number of ACD system makers (e.g., the Spectrum system made by Rockwell International). The Spectrum system typically has a broadcast capability accommodating three data links between peripheral devices. These links broadcast whatever data the Spectrum has among the three links. As such, peripherals may get messages which may not be of interest to the peripheral.

One solution is the development of separate logical links for each of the data paths. However, this requires a large amount of development resources to successfully implement. The programmable messaging link described below provides a much less complex solution.

As shown in FIG. 1, one or more ACDs 14, 16, 18 of the system 10 may receive calls from the PSTN 12 and distribute the calls among a local group of agents (not shown) assigned to each particular ACD 14, 16, 18.

Also shown in FIG. 1 is a host 20, 22, 24 connected to a respective ACD 14, 16, 18. Each host 20, 22, 24 may receive information about calls from it respective ACD and exchange information about callers with a terminal of an assigned agent.

While each host 20, 22, 24 of FIG. 1 is shown connected to a single ACD 14, 16, 18, it should be understood that each host (e.g., 20) may serve more than one ACD (e.g., 14). Since each host 20, 22, 24 and each ACD 14, 16, 18 performs a supporting function within the system 10, hosts or ACDs may be individually referred to as system peripherals.

As calls are received by the ACDs 14, 16, 18 from the PSTN 12, the PSTN 12 may also transfer destination and source information about each call to the ACD 14, 16, 18. The receiving ACD 14 may assign a call identifier, unique to that ACD, and begin the process of identifying an agent to service that call. The ACD 14, 16, 18 may also transfer a call arrival message to its respective host 20, 22, 24. Alternatively, once the ACD 14, 16, 18 has identified an agent, the ACD 14, 16, 18 may transfer a call assignment message to the host 20, 22, 24. The respective host 20, 22, 24 may broadcast that message to other connected hosts.

In order to reduce message traffic, each peripheral 14, 16, 18, 20, 22, 24 of the ACD system 10 is provided with a message processing table 30 (FIG. 2), which forms a basis for a programmable messaging link. Included within the message table 30 is a message identifier side 32 (shown on the left) and a destination side 34 (shown on the right).

Messages within the system 10 may be forwarded (or not forwarded) based upon a content of the message table 30. For instance, the table 30 may contain indices of messages that are not to be forwarded. Alternatively, the table 30 may be used to identify messages which are to be forwarded.

Where the table 30 is used for messages which are not to be forwarded, a CPU (e.g., 29) may use the contents of the table 30 as a means of deleting messages. For example, messages may be received in a receive buffer (not shown) of the CPU 29 and be transferred by the CPU 29 to a transmit buffer for transmission (broadcasting) to other connected peripherals. As each message is detected in a receive buffer of the CPU 29, a comparison is made between that message and the individual entries of the table 30. Where a match is found, the message may be deleted before it can be re-broadcast to the one or more connected peripherals.

Alternatively, the table 30 may be used (in an opposite sense) to forward messages. When used in the opposite sense, messages are compared with the table 30 and when a match is found, the message is only forwarded to the destination specified in the table 30.

The message identifier side 32 of the table 30 may be structured to contain a number of message identifiers. Typically each message identifier correlates with a single message destination, but in some cases a particular message identifier may be correlated with many destinations or a destination may be correlated with many types of message identifiers.

A message identifier may refer to a particular type of messages or a message from a particular source. For example, a particular type of message identifier may be "call arrival" message, an "agent assignment" message, a "call overflow" or a "fault message".

Further, the entries of the message identifier side 32 of the message processing table 30 may be further differentiated through use of a message matrix 36 (FIG. 3). A message matrix 36 may be described as a set of attributes that a message may need before it will be forwarded (not forwarded) to a particular destination. For example, one of the messages of the message identifier side 32 of the message table 30 may correspond to one of the lines 38, 40, 42, 44, 46, 48, 50 of the message matrix 36.

As a more specific example, the table 30 of FIG. 2 may reside in a memory 28 the second host 22. Message #1 of the message identifier side 32 of the table 30 may correspond to the second line 40 of the message matrix 36 of FIG. 3. A destination "a" of the destination side 34 may correspond to the first host 20.

As messages are received by the second host 22, they are compared to the message identifiers on the message identifier side 32 of the forwarding table 30. In the example above, where a message is identified as being from third host 24 regarding fault messages about ANI, that message would be sent (not sent) to the requesting host 20 depending upon the use of the message table 30.

As another example, message identifier #5 of the message identifier side 32 of FIG. 2 may correspond to the first line 38 of the message matrix 36. Further, destination "d" may correspond to the third host 24. In this example, overflow messages from the ACD 14 of the first host 20 regarding overflow calls from agent #1 would be sent (not sent) to the third host 24 depending upon the use of the message table 30.

The message table 30 and message matrix 36 may be created during startup of the system 10 and modified during use. For example, the third host 24 may wish to receive all (or none of the) messages from the first ACD 14. Upon startup, the third host may by reference to a lookup table and determine that the first ACD 14 may be contacted through the second host 22. As such, the third host 24 sends a message to the second host 22 concerning messages from the first ACD 14.

The second host 22 by reference to its own lookup table determines that the first ACD 14 is not directly connected to it and therefore sends a message to the first host 20 concerning the messages from the first ACD 14. The second host 22 also makes an entry in its own table 30. On the right side 34, the second host 22 enters an identifier of the third host 24. On the left side 32 on the same line, the second host 22 enters an identifier of the message or, where necessary, a reference to a particular line 38 of the message matrix 36. Where a reference is made to a particular line 38 of the message matrix 36, the second host 22 enters an identifier of the ACD 14 and other information into an appropriate position of the reference line 38.

Similarly, when the first host 20 receives the request regarding the messages from the first ACD 14, the first host 20 makes an entry into its forwarding table. By reference to a lookup table, the first host 20 determines that the first ACD 14 is connected directly to it and enters an identifier of the first ACD 14 (as a type of message identifier) on the left side 32 of its forwarding table 30. The first host 20 also enters an identifier of the second host 22 on the right side 34 of its table 30 on the same line.

The use of the message table 30 allows a peripheral to selectively exclude messages, or message elements which are not of interest to the peripheral. The table 30 allows peripherals to send programming messages on initialization of the peripheral to specify the messages it does not want to see (or which it does want to see) on the messaging link. The programming messages and table 30 may be used as part of a simple messaging filter which may functions to reduce or exclude messages over a particular link. This effectively provides the same sort of functionality as having separate logical links.

A specific embodiment of a method and apparatus for select messaging in a multiple messaging link environment according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

The invention claimed is:

1. A method of reducing system message traffic among system peripherals of an automatic call distributor, such method comprising the steps of:

forming a message table in a first system peripheral of the automatic call distributor where the message table contains indicia that controls whether system messages are broadcast to other system peripherals of the automatic call distributor or deleted based upon a message type defined by said indicia; and broadcasting a system message received by the first system peripheral from a source system peripheral to other system peripherals of the automatic call distributor when the message table indicates that the system message should be forwarded and, otherwise, deleting the system message when a comparison of the indicia within the message table with a content of the message indicates that the message should be deleted.

2. The method of reducing message traffic as in claim 1 further comprising entering an identifier of a message to be forwarded into the formed message table in the peripheral.

3. The method of reducing message traffic as in claim 2 wherein the step of entering the identifier of the message further comprises entering a corresponding destination identifier to the entry.

4. The method of reducing message traffic as in claim 3 wherein the step of entering the identifier further comprising providing a reference to a line of a message matrix.

5. The method of reducing message traffic as in claim 4 wherein the step of sending the list of unnecessary messages further comprises storing the list in said table of the automatic call distributor.

6. The method of reducing message traffic as in claim 5 further comprising forming a message for transmission to a set of peripherals, including said peripheral.

7. The method of reducing message traffic as in claim 6 wherein the step of forming a message for transmission to a set of peripherals further comprises retrieving an identifier of said peripheral of the set of peripherals.

8. The method of reducing message traffic as in claim 7 wherein the step of retrieving an identifier of said peripheral of the set of peripherals further comprises retrieving the list of unnecessary messages from said table based upon said identifier of said peripheral.

9. The method of reducing message traffic as in claim 8 wherein the step of retrieving the list further comprises comparing an identifier of the message with the list of unnecessary messages transmitted from said peripheral to the automatic call distributor.

10. The method of reducing message traffic as in claim 1 further comprising the step of comparing an identifier of a message with a list of unnecessary messages and discarding the message when a match is found between the identifier of the message and an entry of the list of unnecessary messages.

11. Apparatus for reducing system message traffic in an automatic call distributor, such apparatus comprising:
means for forming a message table within a forwarding system peripheral, said message table containing indicia that controls broadcasting system messages received from a message source system peripheral by the forwarding system peripheral to a destination system peripheral of the automatic call distributor when a system message defined by said indicia indicates that the system message should be broadcast and deleting the system message when the message type defined by said indicia indicates that the system message should be deleted; and
means for amending the table upon startup of the peripheral.

12. The apparatus for reducing message traffic as in claim 11 further comprising means for forming a list of identifiers of unnecessary messages in the peripheral upon startup.

13. The apparatus for reducing message traffic as in claim 12 wherein the means for forming the list of unnecessary messages further comprises means for retrieving the list from memory.

14. The apparatus for reducing message traffic as in claim 13 further comprising means for sending the list of unnecessary messages to the automatic call distributor.

15. The apparatus for reducing message traffic as in claim 14 wherein the means for sending the list of unnecessary messages further comprises means for storing the list in said table of the automatic call distributor.

16. The apparatus for reducing message traffic as in claim 15 further comprising means for forming a message for transmission to a set of peripherals, including said peripheral.

17. The apparatus for reducing message traffic as in claim 16 wherein the means for forming a message for transmission to a set of peripherals further comprises means for retrieving an identifier of said peripheral of the set of peripherals.

18. The apparatus for reducing message traffic as in claim 17 wherein the means for retrieving an identifier of said peripheral of the set of peripherals further comprises means for retrieving the list of unnecessary messages from said table based upon said identifier of said peripheral.

19. The apparatus for reducing message traffic as in claim 18 wherein the means for retrieving the list further comprises means for comparing an identifier of the message with the list of unnecessary messages transmitted from said peripheral to the automatic call distributor.

20. The apparatus for reducing message traffic as in claim 19 wherein the means for comparing the identifier of the message with the list of unnecessary messages further comprises means for discarding the message when a match is found between the identifier of the message and an entry of the list of unnecessary messages.

21. Apparatus for reducing system message traffic in an automatic call distributor, such apparatus comprising:
a message table within a memory of the automatic call distributor containing indicia that controls broadcasting system messages received from a message source system peripheral to a destination system peripheral of the automatic call distributor when a system message type defined by said indicia indicates that the system message should be broadcast and deleting the system message when the message type defined by said indicia indicates that the system message should be deleted; and
a message processor adapted to amend the table upon startup of the system peripheral.

22. The apparatus for reducing message traffic as in claim 21 further comprising a table within a memory of the peripheral adapted to form a list of identifiers of unnecessary messages in the peripheral upon startup.

23. The apparatus for reducing message traffic as in claim 22 wherein the table for forming the list of unnecessary messages further comprises a peripheral processor adapted to retrieve the list from memory.

24. The apparatus for reducing message traffic as in claim 23 further comprising a communication processor adapted to send the list of unnecessary messages to the automatic call distributor.

25. The apparatus for reducing message traffic as in claim 21 further comprising a communication processor adapted to send a list of unnecessary messages to the automatic call distributor and a receiving processor adapted to store the list in said message table of the automatic call distributor.

* * * * *